UNITED STATES PATENT OFFICE.

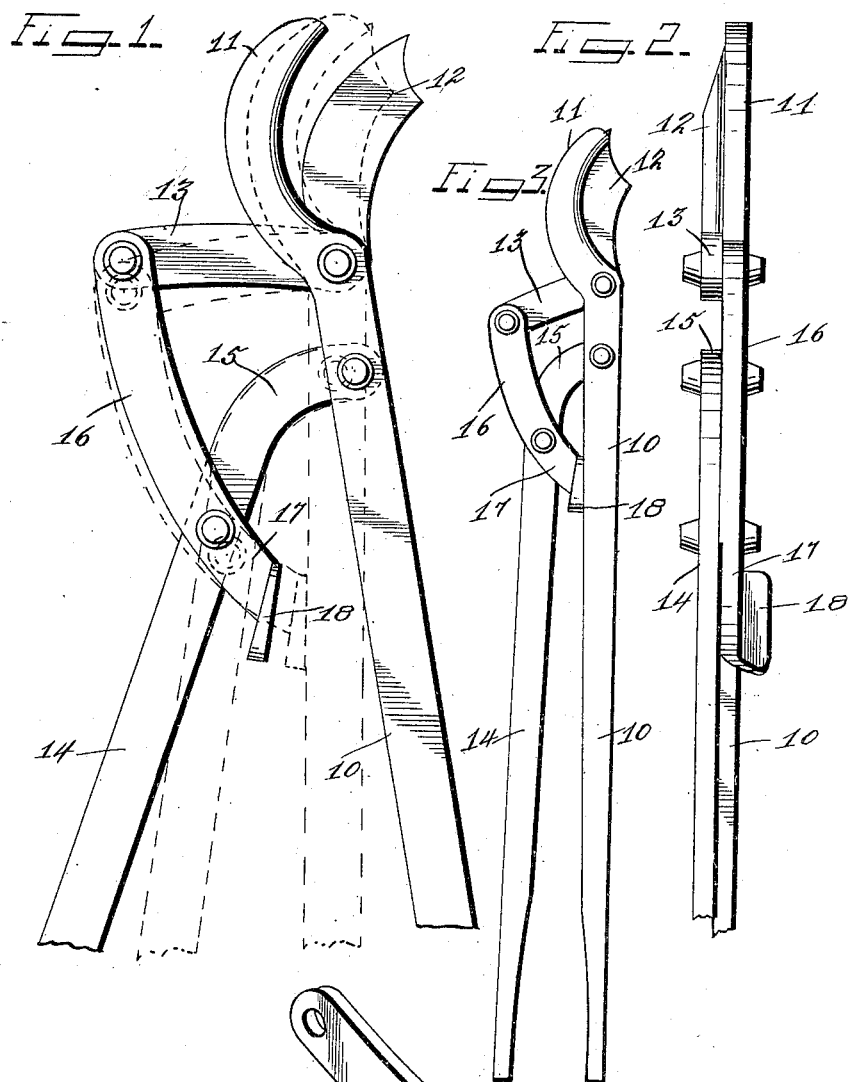

THEODOR KRESEEN, OF YOUNG AMERICA, INDIANA.

SHEARS.

1,088,429.

Specification of Letters Patent.

Patented Feb. 24, 1914.

Application filed June 17, 1913. Serial No. 774,148.

*To all whom it may concern:*

Be it known that I, THEODOR KRESEEN, a citizen of the United States, residing at Young America, in the county of Cass and State of Indiana, have invented certain new and useful Improvements in Shears, of which the following is a specification, reference being had therein to the accompanying drawing.

This invention relates to improvements in shears or cutters employed for trimming trees, bushes, etc., and has for its object the production of such an implement in which the handles are always kept in spaced relation relative to each other, and thus providing a space between the handles for the fingers of the operator.

Another object of this invention is to provide a pair of shears or cutter implement that has a combined connecting link and stop to prevent the handles from abutting.

A still further object of this invention is to provide a pair of shears that has better leverage than is provided for by the ordinary connections used with trimming shears.

With these and other objects in view, this invention consists of certain novel combinations, constructions and arrangements of parts as will be hereinafter fully described and claimed.

In the accompanying drawing: Figure 1 is a side elevation of this device with the handles in an open position and indicated in a closed position in dotted lines. Fig. 2 is an edge view of the cutter with the handles broken away. Fig. 3 is a side elevation of the entire device in a closed position. Fig. 4 is a perspective view of the combined connecting link and stop.

Referring to the accompanying drawing by reference numerals, 10 designates a primary handle which has a primary blade 11 at its upper end. Pivotally mounted at the lower end of the blade 11 is an auxiliary blade 12 provided with an angularly extending link member 13. Pivotally mounted on the primary handle 10 adjacent its upper end, is an auxiliary handle 14 which is provided with a curved end 15 at its upper end. A connecting link 16 is pivotally mounted at the end of the angular link member 13 and is also connected to the auxiliary handle 14 adjacent its upper end. This connecting link 16 extends a distance beyond the edge of the auxiliary handle 14 as shown at 17 and is provided at its lower end with a laterally extending stopping foot 18 which is adapted to abut against the face of the handle 10.

It will be seen from the foregoing description that the applicant has devised a tree or bush trimmer that has the same amount of cutting force given to its blades by means of the leverage, as shown as the ordinary trimmer and provides a novel means for holding the handles 10 and 14 at spaced relation as shown clearly in Fig. 3 and indicated in the dotted position shown in Fig. 1. The cutting blades 11 and 12 are brought together and are as efficient in cutting as the ordinary trimming implement, in spite of the fact that their handles are in a comparatively open position. It will be seen that not only an improved means for keeping the handles from jamming each other been provided as is clearly illustrated in the drawings, but an efficient leverage for the cutting blades is also produced. The angularly extending member 13 of the auxiliary blade 12, the auxiliary handle 14 which are pivotally connected to the primary handle 10 and are connected to each other by means of the link 16 constituting an improved leverage that makes the device very easy to operate.

It is obvious that minor changes may be made in the form and construction of this invention without departing from the spirit thereof. It is therefore not wished to confine the invention to the exact form herein shown and described, but it is wished to include all such as properly come within the scope claimed.

What is claimed, is:

A pair of shears comprising a primary handle provided with a cutting knife at one end, an auxiliary handle pivotally mounted to said primary handle, an auxiliary cutting blade provided with an angularly extending link member pivotally mounted adjacent one end of said primary handle, a connecting link connecting said angularly extending link member, and said auxiliary handle, said connecting link extending beyond the edge of said auxiliary handle, and said portion extending beyond the edge of said auxiliary handle and provided with a laterally extending foot adapted to engage said primary handle for holding said handle in a spaced relation relative to each other when in a closed position.

In testimony whereof I hereunto affix my signature in presence of two witnesses.

THEODOR KRESEEN.

Witnesses:
 ABRAHAM JOHNSON,
 JAMES O. HENDRIX.

Copies of this patent may be obtained for five cents each, by addressing the "Commissioner of Patents, Washington, D. C."